US012620267B2

(12) United States Patent
Moon et al.

(10) Patent No.: US 12,620,267 B2
(45) Date of Patent: May 5, 2026

(54) DISPLAY APPARATUS AND METHOD THEREOF FOR GUIDED BIOMETRIC INDEX MEASUREMENT

(71) Applicant: SAMSUNG ELECTRONICS CO., LTD., Suwon-si (KR)

(72) Inventors: Jibum Moon, Suwon-si (KR); Yuri Min, Suwon-si (KR); Dongwon Kim, Suwon-si (KR); Donghoon Lee, Suwon-si (KR); Eunae Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 5 days.

(21) Appl. No.: 18/403,408

(22) Filed: Jan. 3, 2024

(65) Prior Publication Data

US 2024/0203165 A1      Jun. 20, 2024

Related U.S. Application Data

(63) Continuation of application No. PCT/KR2023/014201, filed on Sep. 19, 2023.

(30) Foreign Application Priority Data

Dec. 15, 2022      (KR) ........................ 10-2022-0176342
Feb. 6, 2023      (KR) ........................ 10-2023-0015397

(51) Int. Cl.
*G06V 40/60*          (2022.01)
*G06T 7/60*          (2017.01)
(Continued)

(52) U.S. Cl.
CPC ................ *G06V 40/60* (2022.01); *G06T 7/60* (2013.01); *G06T 7/70* (2017.01); *G06V 40/15* (2022.01);
(Continued)

(58) Field of Classification Search
CPC . G06T 2207/30201; G06T 2207/30244; G06T 7/60; G06T 7/70; G06V 10/141;
(Continued)

(56) References Cited

U.S. PATENT DOCUMENTS 11,282,599 B2      3/2022  Mason et al.
2017/0351327 A1*  12/2017  Yasuda ................... G06F 3/013
(Continued)

FOREIGN PATENT DOCUMENTS

AU          2015201759 A1      10/2015
AU          2015218542 A1      3/2016
(Continued)

OTHER PUBLICATIONS

International Search Report (PCT/ISA/210) issued by the International Searching Authority on Jan. 11, 2024 in International Application No. PCT/KR2023/014201.
(Continued)

*Primary Examiner* — Kathleen M Walsh
(74) *Attorney, Agent, or Firm* — Sughrue Mion, PLLC

(57)          ABSTRACT

A display apparatus includes a display, and at least one processor. The at least one processor is configured to identify a guide area, of a plurality of areas of the display, corresponding to a position of a camera; control the display to display a guide image in the guide area; and identify a biometric index of a user positioned at a front surface of the display, based on a measurement image, captured by the camera during display of the guide image in the guide area, of a face of the user.

19 Claims, 10 Drawing Sheets

(51) Int. Cl.

| | | |
|---|---|---|
| *G06T 7/70* | (2017.01) |
| *G06V 40/10* | (2022.01) |
| *G06V 40/16* | (2022.01) |
| *H04N 23/71* | (2023.01) |
| *H04N 23/74* | (2023.01) |

(52) U.S. Cl.
CPC ........... *G06V 40/161* (2022.01); *H04N 23/71* (2023.01); *H04N 23/74* (2023.01); *G06T 2207/30201* (2013.01); *G06T 2207/30244* (2013.01)

(58) Field of Classification Search
CPC .... G06V 40/15; G06V 40/161; G06V 40/172; G06V 40/60; G06V 40/67; H04N 23/71; H04N 23/74
USPC ........................................................... 348/77
See application file for complete search history.

(56) References Cited

U.S. PATENT DOCUMENTS

| | | | |
|---|---|---|---|
| 2019/0303551 A1* | 10/2019 | Tussy | H04W 12/06 |
| 2020/0167549 A1 | 5/2020 | Taoka et al. | |

| | | | |
|---|---|---|---|
| 2020/0221021 A1* | 7/2020 | Arai | H04N 23/633 |
| 2021/0200307 A1* | 7/2021 | Novelli | G06V 40/172 |
| 2024/0164672 A1* | 5/2024 | Pasley | G06F 3/015 |

FOREIGN PATENT DOCUMENTS

| | | |
|---|---|---|
| JP | 2016-112024 A | 6/2016 |
| JP | 2020-88557 A | 6/2020 |
| JP | 2020-89910 A | 6/2020 |
| JP | 2021-183079 A | 12/2021 |
| KR | 10-2021-0025847 A | 3/2021 |
| KR | 10-2021-0076539 A | 6/2021 |
| KR | 10-2022-0116791 A | 8/2022 |
| KR | 10-2022-0164222 A | 12/2022 |

OTHER PUBLICATIONS

Written Opinion (PCT/ISA/237) issued by the International Searching Authority on Jan. 11, 2024 in International Application No. PCT/KR2023/014201.
Communication issued Nov. 17, 2025 by the European Patent Office in European Patent Application No. 23903690.8.

* cited by examiner

SIGHTLINE
OF MEASURER

CAMERA
CAPTURING ANGLE

DISPLAY APPARATUS AND METHOD THEREOF FOR GUIDED BIOMETRIC INDEX MEASUREMENT

CROSS-REFERENCE TO RELATED APPLICATIONS

This application is a by-pass continuation application of International Application No. PCT/KR2023/014201, filed on Sep. 19, 2023, which is based on and claims priority to Korean Patent Application No. 10-2022-0176342, filed on Dec. 15, 2022, in the Korean Intellectual Property Office and Korean Patent Application No. 10-2023-0015397, filed on Feb. 6, 2023, in the Korean Intellectual Property Office, the disclosures of each of which are incorporated by reference herein in their entireties.

BACKGROUND

1. Field

The disclosure relates to a display apparatus and a method thereof for guided biometric index measurement, and more particularly, to a display apparatus that displays a guide image at an area that corresponds to a position of a camera while measuring a biometric index and a method for display thereof.

2. Description of Related Art

A display apparatus may display an image that corresponds to an image signal provided from an external source. Recent display apparatuses tend to use user captured images for video communications, interaction motions, and the like.

To use captured images, recent display apparatus may be embedded with a camera, or receive an image from a camera adjacently disposed and use the received image. There is a demand for a method which can provide a new service in addition to services such as the above-described video communication when using the captured image of the camera as described above.

SUMMARY

According to one or more embodiments, a display apparatus for guided biometric index measurement includes a display, and at least one processor. The at least one processor is configured to: identify a guide area, of a plurality of areas of the display, corresponding to a position of a camera; control the display to display a guide image in the guide area; and identify a biometric index of a user positioned at a front surface of the display, based on a measurement image, captured by the camera during display of the guide image in the guide area, of a face of the user.

According to one or more embodiments, a method for guided biometric index measurement includes: identifying a guide area, of a plurality of areas of a display, corresponding to a position of a camera; displaying a guide image in the guide area on the display; receiving input of a measurement image, captured by the camera during display of the guide image in the guide area, of a face of a user positioned at a front surface of the display apparatus; and identifying a biometric index of the user based on the measurement image.

According to one or more embodiments, a non-transitory computer-readable recording medium has instructions stored thereon. The instructions are executable by at least one processor to perform operations including: identifying a guide area, of a plurality of areas of a display, corresponding to a position of a camera; displaying a guide image in the guide area on the display; receiving input of a measurement image, captured by the camera during display of the guide image in the guide area, of a face of a user positioned at a front surface of the display apparatus; and identifying a biometric index of the user based on the measurement image.

BRIEF DESCRIPTION OF THE DRAWINGS

The above and other aspects, features, and advantages of certain embodiments of the disclosure will be more apparent from the following descriptions taken in conjunction with the accompanying drawings, in which.

DETAILED DESCRIPTION

Figure 1:
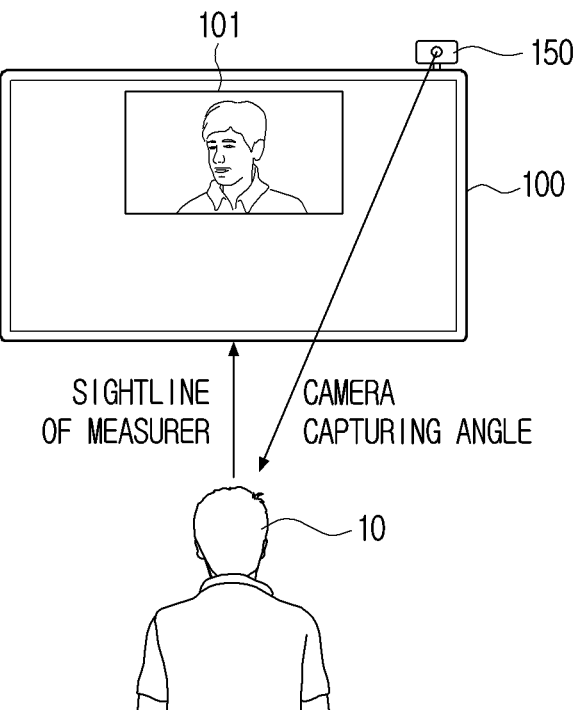
FIG. 1 is a diagram illustrating an example execution of a biometric index measurement method, according to one or more embodiments of the disclosure.

Embodiments of the disclosure will be explained in detail below with reference to the accompanying drawings.

Terms used in describing one or more embodiments of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected, and in this case, the meaning of the term will be disclosed in greater detail in the corresponding description. Accordingly, the terms used herein are not to be understood simply as their designations, but based on the meaning of the terms and the overall context of the disclosure.

In the disclosure, expressions such as "have," "may have," "include," "may include," or the like are used to designate a presence of a corresponding characteristic (e.g., elements such as numerical value, function, operation, or component), and not to preclude a presence or a possibility of additional characteristics.

The expression at least one of A and/or B is to be understood as indicating any one of "A" or "B" or "A and B."

Expressions such as "first," "second," "1st," "2nd," and so on used herein may be used to refer to various elements regardless of order and/or importance. Further, it should be noted that the expressions are merely used to distinguish an element from another element and not to limit the relevant elements.

A singular expression includes a plural expression, unless otherwise specified.

It is to be understood that terms such as "form" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

One or more embodiments of the disclosure will be described in greater detail below with reference to the accompanied drawings.

In the related art, a method of measuring a biometric index (e.g., a heart rate, a heart rate variability, a respiration rate, an oxygen saturation, a stress index, etc.) of a user may be performed by placing a specific sensor in close contact with a skin surface of the user.

Here, "heart rate" may refer to a pulse rate of a heart, and the value thereof may be measured by a heart pulse rate per minute. Further, the heart rate variability may be a measurement value of a variation that is apparent from an elapsed time in-between heart rates, and may be calculated using heart rate information identified in a heart rate measurement process. Further, "respiration rate" may refer to a number of respirations per minute that is carried out by a breathing exercise. Further, the oxygen saturation may represent an oxygen concertation in blood that shows a ratio of oxygen and hemoglobin combined. The stress index may be an index that shows a state of health and a state of psycho-physiological stability, and may be calculated by tracking the heart rate index described above.

However, as will be disclosed herein, the biometric index as described above need not use the specific sensor described above (e.g., a heart rate pulse sensor in an infrared method). Herein, a method is proposed for measuring a biometric index based on an image analysis.

FIG. 1 is a diagram illustrating an example execution of a biometric index measurement method, according to one or more embodiments of the disclosure.

Referring to FIG. 1, blood vessels of a human user 10 may be observed from a facial area, and it may be possible to measure the above-described biometric index by observing changes in the blood vessels that are visible. Additionally, the respiration rate may also be measured through change to a shape of a mouth or a shape of a nose of the user 10.

Based on the blood vessels that are visibly measurable being typically disposed at a front surface of a face of a user 10, a biometric index measurement may preferentially use an image capturing the front surface of the face of the user 10.

If the heart rate, the heart rate variability, and the like is measured by observing a change in a corresponding area for a certain time (e.g., 30 seconds to 1 minute), and is therefore not something that can be measured instantly in a practical manner, a user 10 may be instructed to continuously look at a camera 150 while a measurement is being performed.

Based on the above, it may be desirable for a display apparatus 100 to continuously display a guide image 101 for the user 10 to gaze at a camera 150 during a measurement process. For example, the guide image 101 described above may be a thumbnail image corresponding to the facial area of the user 10, selected from one or more earlier images that captured the facial area of the user 10. The camera 150 may, as preparation for the measurement process, capture one or more images of the user 10 for use as the guide image 101; the images will be termed "preparation images" herein. The preparation image may be a series of images, or a video image.

When a user's face comes in sight, the user typically looks at their own face. For example, when a user's face is displayed on a display, the user may be expected to look in the direction of their face on the display. A process of generating a thumbnail image corresponding to the user's face, and displaying said thumbnail image on the display, will now be described.

As shown in FIG. 1, if the camera 150 is positioned at a side surface and not a center of the display 100, and the guide image 101 is displayed at a front of the display 100, the face of the user 10 within an image captured from the camera may be toward an undesirable direction, causing the face in the image to be distorted by a certain degree and to not present an undistorted front surface area, because the user has looked at the area at their own face is displayed.

Accordingly, in the disclosure, the guide image 101 may be displayed in an area corresponding to the position of the camera, such that the user 10 is influenced to look at a camera direction, namely, the direction of the face intended for use in a measurement of a biometric index. The user's face may then be captured by the camera while the user is looking in the desired camera direction.

A more detailed operation of the disclosure will be described further herein.

In FIG. 1, the camera 150 and the display apparatus 100 have been shown as separate configurations, but the camera 150 may alternatively be integrated in the display apparatus 100 during manufacture.

Figure 2:
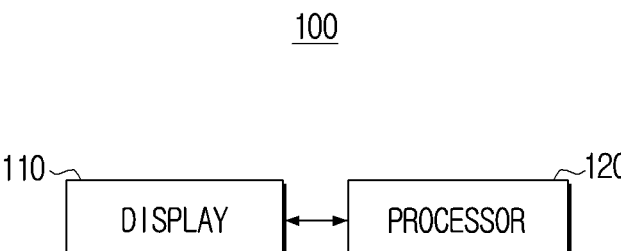
FIG. 2 is a block diagram illustrating an example configuration of a display apparatus, according to one or more embodiments of the disclosure.

FIG. 2 is a block diagram illustrating an example configuration of a display apparatus, according to one or more embodiments of the disclosure.

Referring to FIG. 2, the display apparatus 100 may include a display 110 and a processor 120.

The display apparatus 100 according to various embodiments of the disclosure may be an apparatus that is used from a fixed position such as, for example, a television (TV), a monitor, a notebook, and a personal computer (PC). However, in addition to devices that are disposed at fixed positions, the display apparatus may include at least one from among, for example, a smartphone, a tablet PC, a mobile phone, a video phone, an e-book reader, a desktop PC, a laptop PC, a netbook computer, a work station, a server, a personal digital assistant (PDA), a portable multimedia player (PMP), a medical device, a camera, or a wearable apparatus so long as it is an apparatus that includes a display.

The display 110 may be realized as a display of various forms such as, for example, and without limitation, a liquid crystal display (LCD), an organic light emitting diode (OLED) display, a plasma display panel (PDP), and the like. In the display 110, a driving circuit, which may be realized in the form of an a-si thin film transistor (TFT), a low temperature poly silicon (LTPS) TFT, an organic TFT (OTFT), or the like, a backlight unit, and the like may be included. Furthermore, the display 110 may be realized as a touch screen coupled with a touch sensor, a flexible display, a three-dimensional display (3D display), and the like.

The display 110 may output various images. Further, the display 110 may display an image for notifying a user about a measurement preparation, a measurement process, and the like of the biometric index.

Further, the display 110 may display a guide image for the user to continuously look at while measuring the biometric index. The guide image may be displayed in an area corresponding to the position of the camera from among a plurality of areas, and various images such as, for example, a captured image corresponding to a facial area of the user, or the like may be used from among images provided by the camera or other sources. For example, the display 110 may display the guide image at an area corresponding to a line segment adjacent to the camera from among a plurality of line segments of the display, and further corresponding to a position adjacent to the camera on the line segment adjacent with the camera.

If a size of the guide image is too large—for example, if a size of the guide image is a majority of a size of the display 110—the user may look at an area which does not correspond to a camera position. As such, if the guide image is oversized, the user may be directed to look at the camera direction by looking at a specific portion of the corresponding guide image.

A guide image may be identified as an "oversized image" if an area it occupies equals or exceeds a certain ratio or percentage of the size of the display, such as one fourth of the size of the screen of the display. The ratio or percentage may be identified based on a distance of the display from the user and the size of the display. The distance of the display from the user may be estimated based on a size of the user within a captured preparation image.

The processor 120 may perform an overall control operation of the display apparatus 100. Specifically, the processor 120 may control the overall operation of the display apparatus 100.

The processor 120 may be realized as a digital signal processor (DSP) that processes a digital signal, a microprocessor, or a time controller (TCON). However, the above is not limited thereto, and may include one or more from among a central processing unit (CPU), a micro controller unit (MCU), a micro processing unit (MPU), a controller, an application processor (AP), a graphics-processing unit (GPU), a communication processor (CP), or an ARM processor, or may be defined by the corresponding term. In addition, the processor 120 may be realized as a System on Chip (SoC) or a large scale integration (LSI) embedded with a processing algorithm, and may be realized in a form of a field programmable gate array (FPGA). In addition, the processor 120 may perform various functions by executing computer executable instructions stored in a memory.

The processor 120 may control the display 110 to display an image. Further, the processor 120 may determine whether to measure a biometric index. For example, if a command to measure the biometric index is input from the user, the processor 120 may determine that the biometric index will be measured. The measurement command may be input through a suitable input mechanism, such as actuation of one or more buttons on a remote control, or a voice command.

If the biometric index is to be measured, the processor 120 may control the display 110 for the guide image to be displayed. As described above, it may be desirable to display the guide image at an area corresponding to the position of the camera, and therefore, the processor 120 may identify the position of the camera in advance.

Various suitable measures for identifying the position of the camera may be used. One example process uses pre-stored position information. For example, if the camera is embedded in or otherwise integrated with the display apparatus 100, a manufacturer may store position information of the camera in the display apparatus 100. Alternatively, the user may directly input the position information of the camera and the like. Alternatively, the position of the camera may be identified through another of the processes described herein, and after an initial identification, the position information may be stored and used in later operations without need to repeat the other identification process.

Another example process uses a camera position detecting sensor embedded in the display apparatus 100. Based on the above, the display apparatus 100 may use the position information detected from the detecting sensor. A method of using the detecting sensor will be described in detail in FIG. 3.

Yet another example process identifies a disposed position of the camera by displaying a pre-set image in the display apparatus 100, identifying a user captured image input from the camera, and identifying a face direction (or a sightline direction) of the user identified on the captured image. For example, if a user sightline is toward a front in the captured image, the camera may be identified as positioned at a center of the display apparatus 100. Alternatively, if the user sightline in the captured image is distorted by about 15°, the camera may be identified as positioned in a position corresponding to 15° in a direction opposite to the user sightline.

Still another example process identifies the position of the camera by dividing the display apparatus 100 into a plurality of areas, displaying an image having a specific number in each area, and having the user input the number of the area most adjacent with the camera.

The above-described position of the camera may also be identified with an accurate position value, and identified at a level of dividing the display into the plurality of areas, and calculating the position at which the guide image is to be displayed from among the divided plurality of areas (as such, the position may be in any one from among the plurality of areas) in displaying the guide image which will be described below.

As described above, if the position of the camera is identified, the processor 120 may control the display 110 to display an image that includes the guide image at an area corresponding to the identified position of the camera. Specifically, the processor 120 may control the display 110 to display a screen that includes the guide image at an area corresponding to the line segment adjacent to the camera from among the plurality of line segments of the display, and further corresponding to a position adjacent to the camera on the line segment adjacent to the camera.

The guide image may be a thumbnail image corresponding to the facial area of the user in the captured image.

A captured face image of the user has been shown and described as being used as the guide image in the disclosure, but another image other than a face image may be used at realization. For example, if the guide image of the disclosure is for guiding the user to continuously look at the camera direction, to thereby direct the face direction (or sightline) of the user, a specific content (animation, etc.) other than the face image may be displayed in a small size, or a shape in a cross form or the like may be displayed.

Further, in the measurement process, the processor 120 may control the display 110 to display an image including the above-described guide image and information that shows a current measurement process (process in progress).

In addition, the processor 120 may estimate a distance between the user and the display apparatus 100 based on a size of the face of the user estimated from the captured image, and the like. Through the estimation as described above, the processor 120 may adjust the size or the like of the displayed guide image described above, or have the user positioned at a distance at which the biometric index is measurable through a notification. For example, the user may be positioned too far, and thereby may cause identifying the biometric index through the captured image to be difficult. Mindful of this possibility, the processor 120 may identify a distance between the user and the display apparatus 100, and determine whether to display the notification based on the distance.

Further, based on there being shadows in the facial area of the user in the captured image, due to, for example, an environment which lacks a sufficient amount of light (or light amount, intensity of radiation), the processor 120 may control the display 110 to increase a screen brightness from a typical brightness value to a target brightness value, such that the display of the display apparatus 100 is able to perform a lighting function. At this time, a target brightness value, or a target brightness adjustment amount, may be identified based on a light amount value of the facial area of the user in a captured preparation image. In addition, because an effect of a brightness emitted from the display apparatus 100 can be different according to the distance between the display apparatus and the user, the processor 120 may identify the size of the user face on the captured image, estimate the distance from the user, and change a brightness level (or luminance) of the display 110 based further on the estimated distance.

However, if the brightness value of the guide area is too high, it may be difficult for the user to look at the corresponding guide area. Accordingly, the processor 120 may maintain the existing brightness value for a screen area in which the guide image is displayed (e.g. the guide area), and generate an image having a brightness value higher than a pre-set brightness value for display in a remaining area of the display 110 in which the guide image is not displayed (for example, a background area).

The processor 120 may identify the biometric index by using a captured image input through the camera while displaying the guide image. This additional image may be termed a "measurement image." The measurement image may be a series of images, or a video image, for periodically or continuously monitoring the user over a period of time.

A measurement area of the facial area of the user for measuring the biometric index may be identified in the measurement image, and the biometric index may be measured by identifying a change in the identified measurement area. For example, if the heart rate is measured, a blood vessel area on the face of the user may be continuously monitored, and the heart rate may be identified using the changes in the image of the blood vessel area. Then, the processor 120 may perform calculation for other biometric indexes such as heart rate variability, oxygen saturation, and the like through the above-described change in the heart rate.

The processor 120 may continuously monitor a plurality of measurement areas (a plurality of blood vessel areas) rather than a single measurement area, and measure the biometric index using the plurality of areas. For example, a nose area, a lip area, or the like may be monitored and measured in addition to, or alternatively to, the blood vessel area.

The processor 120 may control the display 110 to display information about the degree of progress during the identifying described above together with the above-described guide image.

The processor 120 may measure a second biometric index after completing the measurement of a first biometric index, to thereby measure the biometric indexes as a step-by-step process. Alternatively, the processor 120 may simultaneously measure the plurality of biometric indexes.

In addition, the processor 120 may continuously identify whether an index measurement stop event has occurred while capturing the biometric index. For example, based on the measurement image, the processor 120 may identify whether the facial area of the user is not detected, or whether the face direction of the user is distorted in the captured image. If an index measurement stop event such as described above occurs, the processor 120 may control the display 110 to display a notification message requesting that the user look at the camera direction.

The processor 120 may control the display 110 to display a result of the measured biometric index when the above-described measurement of the biometric index is completed. At this time, the processor 120 may display a value of the measured biometric index, or display information such as whether or not the value is normal through a comparison with a pre-set value. At this time, the processor 120 may also control the display 110 to display the comparison result with a previous measurement information using pre-stored history information.

The display apparatus 100 as described above may measure the biometric index of the user using a captured image of the user, and provide various services using the measured biometric index of the user. In addition, in the above-described measurement process, based on the guide image being displayed at the position corresponding to the camera, accuracy of the above-described biometric index measurement may be more enhanced.

In the above description made with reference to FIG. 2, a simple configuration configuring the display apparatus 100 has been shown and described, but various other configurations may be provided at realization. Another example configuration will be described below with reference to FIG. 3.

Figure 3:
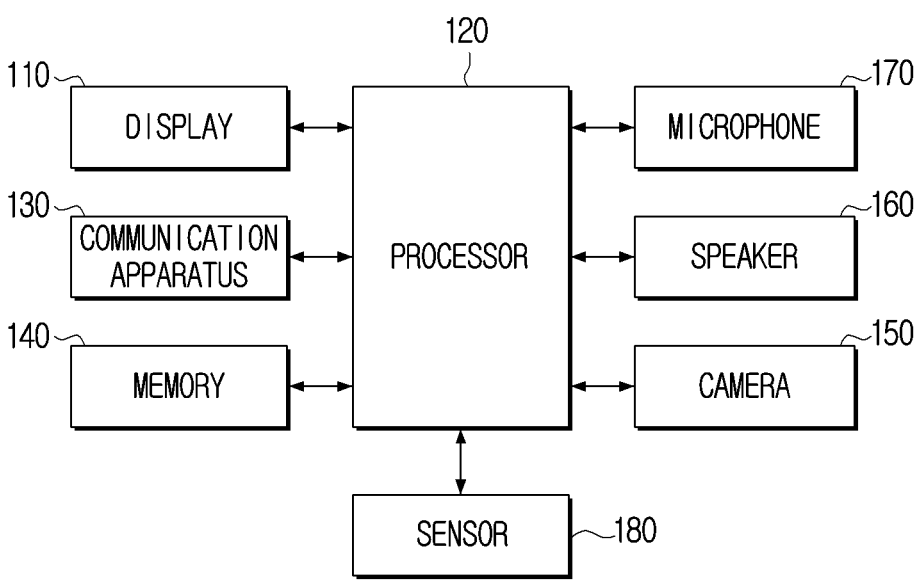
FIG. 3 is a block diagram illustrating a more detailed configuration of a display apparatus, according to one or more embodiments of the disclosure.

FIG. 3 is a block diagram illustrating a more detailed configuration of a display apparatus, according to one or more embodiments of the disclosure.

Referring to FIG. 3, the display apparatus 100 may include the display 110, the processor 120, a communication apparatus 130, a memory 140, a camera 150, a speaker 160, a microphone 170, and a sensor 180.

Redundant descriptions about a same operation as that described previously from among the operations of the display 110 and the processor 120 will be omitted.

The communication apparatus 130 may be a component configured to perform communication with an external apparatus of various types according to communication methods of various types. The communication apparatus 130 may include a Wi-Fi module, a Bluetooth module, an infrared communication module, a wireless communication module, and the like. Here, each communication module may be realized in at least one hardware chip form.

The Wi-Fi module and the Bluetooth module may perform communication in a Wi-Fi method and a Bluetooth method, respectively. When using the Wi-Fi module or the Bluetooth module, various connection information such as a service set identifier (SSID) and a session key may first be transmitted and received, and after communicatively connecting using the same, various information may be transmitted and received.

The infrared communication module may perform communication according to an infrared communication (Infrared Data Association (IrDA)) technology of transmitting data wirelessly in short range by using infrared rays present between visible rays and millimeter waves.

The wireless communication module may include at least one communication chip that performs communication according to various wireless communication standards such as, for example, and without limitation, ZigBee, 3rd Generation (3G), 3rd Generation Partnership Project (3GPP), Long Term Evolution (LTE), LTE Advanced (LTE-A), 4th Generation (4G), 5th Generation (5G), and the like, in addition to the above-described communication methods.

In addition thereto, the communication apparatus 130 may include at least one from among a wired communication module that performs communication using a local area network (LAN) module, an Ethernet module, a pair cable, a coaxial cable, an optical fiber cable, or an ultra wide-band (UWB) module.

According to an example, the communication apparatus 130 may use the same communication module (e.g., Wi-Fi module) to communicate with an external apparatus such as a remote controller and an external server.

According to another example, the communication apparatus 130 may use a different communication module (e.g., Wi-Fi module) to communicate with the external apparatus such as the remote controller and the external server. For example, the communication apparatus 130 may use at least one from among the Ethernet module or the Wi-Fi module to communicate with the external server, and use the Bluetooth (BT) module to communicate with the external apparatus such as the remote controller. However, the above is merely one embodiment, and the communication apparatus 130 may use at least one communication module from among various communication modules when communicating with a plurality of external apparatuses or the external server.

Further, if the camera 150 is positioned outside the display apparatus 100, the communication apparatus 130 may receive a captured image of the user from external camera 150).

Further, the communication apparatus 130 may transmit information about the biometric index measured by the camera 150 in a process which will be described below to the external server (e.g., a medical institution), a user terminal device, or the like. If the biometric index is private information, the biometric index may be encrypted and transmitted without information being leaked in the above-described transmission process.

The memory 140 may be realized as an internal memory such as a read only memory (ROM) included in the processor 120 (e.g., an electrically erasable programmable read-only memory (EEPROM)), a random access memory (RAM), and the like, or realized as a memory separate from the processor 120. In this case, the memory 140 may be realized in a memory form embedded in the display apparatus 100 according to data storage use, or realized in memory form attachable to or detachable from the display apparatus 100. For example, data for driving the display apparatus 100 may be stored in a memory embedded in the display apparatus 100, and data for an expansion function of the display apparatus 100 may be stored in a memory which is attachable to or detachable from the display apparatus 100.

The memory 140 may be stored with captured images. Specifically, captured images input from a camera inside the memory 140 or an external camera may be stored.

Further, the memory 140 may store position information of the camera. The position information described above may be information that is pre-input by a manufacturer if the camera is embedded, and may be a measurement using a sensor which will be described below, measurement through an image analysis, or position information input by the user.

Further, the memory 140 may store the biometric index measured by the process which will be described below. If a plurality of users use the display apparatus 100, the memory 140 may distinguish and store the above-described biometric information for each user.

The memory 140 may additionally store various programs for detecting biometric index measurements, a sightline direction of a user, and the like.

The memory embedded in the display apparatus 100 may be realized as at least one from among a volatile memory (e.g., a dynamic RAM (DRAM), a static RAM (SRAM), or a synchronous dynamic RAM (SDRAM)), or a non-volatile memory (e.g., one time programmable ROM (OTPROM), programmable ROM (PROM), erasable and programmable ROM (EPROM), electrically erasable and programmable ROM (EEPROM), mask ROM, flash ROM, a flash memory (e.g., NAND flash or NOR flash), a hard disk drive (HDD) or a solid state drive (SSD)), and the memory attachable to or detachable from the display apparatus 100 may be realized in a form such as, for example, and without limitation, a memory card (e.g., a compact flash (CF), a secure digital (SD), a micro secure digital (micro-SD), a mini secure digital (mini-SD), an extreme digital (xD), a multi-media card (MMC), etc.), an external memory (e.g., USB memory) connectable to a USB port, or the like.

The camera 150 may capture a front surface direction of the display apparatus 100. As described above, the camera 150 may be positioned at a surrounding of a bezel of the display 110. Alternatively, the camera 150 may capture the front surface direction of the display 110 by being disposed at a back surface of the display 110. For example, a portion area of the display 110 may lack pixels, and the camera 150 may be disposed at the corresponding non-pixel area. For example, the display 110 may be a punch-hole display (or a notch display), and the camera 150 may be disposed at a punch hole area (or a notch area).

Further, the camera 150 may capture the face of the user positioned at the front surface of the display, and provide the captured image to the processor 120.

Although a camera 150 provided in the display apparatus 100 is shown and described in the disclosure, in other embodiments, a camera 150 positioned outside the display apparatus 100 may be used. As such, even if the display apparatus 100 does not include the camera 150, the biometric index may be measured by receiving input of a captured image from an external camera 150.

The speaker 160 may output sound. Specifically, the speaker 160 may be an element that outputs not only various audio data processed from an input and output interface, but also various notification sounds, voice messages, or the like.

The speaker 160 may output various guide messages in a process of measuring biometric information. For example, the speaker 160 may output information associated with a start of a measurement, a guide voice requesting for the camera to be gazed at, and the like.

The microphone 170 may receive a voice of a user while in an activated state. For example, the microphone 170 may be integrally formed at an upper side or a front surface direction, a side surface direction, and the like of the display apparatus 100. The microphone 170 may include various configurations such as a microphone that collects a user voice in an analog form, an amplifier circuit that amplifies the collected user voice, an A/D converter circuit that samples the amplified user voice and converts to a digital signal, a filter circuit that removes noise components from the converted digital signal, and the like.

If a user voice is input through the microphone 170 described above, the processor 120 may identify the content of the user voice, and perform an operation corresponding to the voice content. For example, if a user utters a voice to measure the biometric index (e.g., "please measure heart rate"), the processor 120 may determine that a command for measuring the biometric index is input, and perform an operation for measuring biometric information.

The sensor 180 may be configured to identify the position of the camera. Specifically, the sensor 180 may be disposed at a bezel area of the display apparatus 100, and identify the position of the camera disposed on the bezel area. For example, the sensor 180 may be configured as a magnetic field sensor, and may identify the position of the camera 150 based on an intensity of the magnetic field with a magnet being attached to one side of the camera 150.

In illustrating and describing FIG. 3, various components have been shown as included in the display apparatus 100, but the display apparatus may be realized with a portion of the components omitted at realization. In addition, components other than those shown may be further included.

Figure 4:
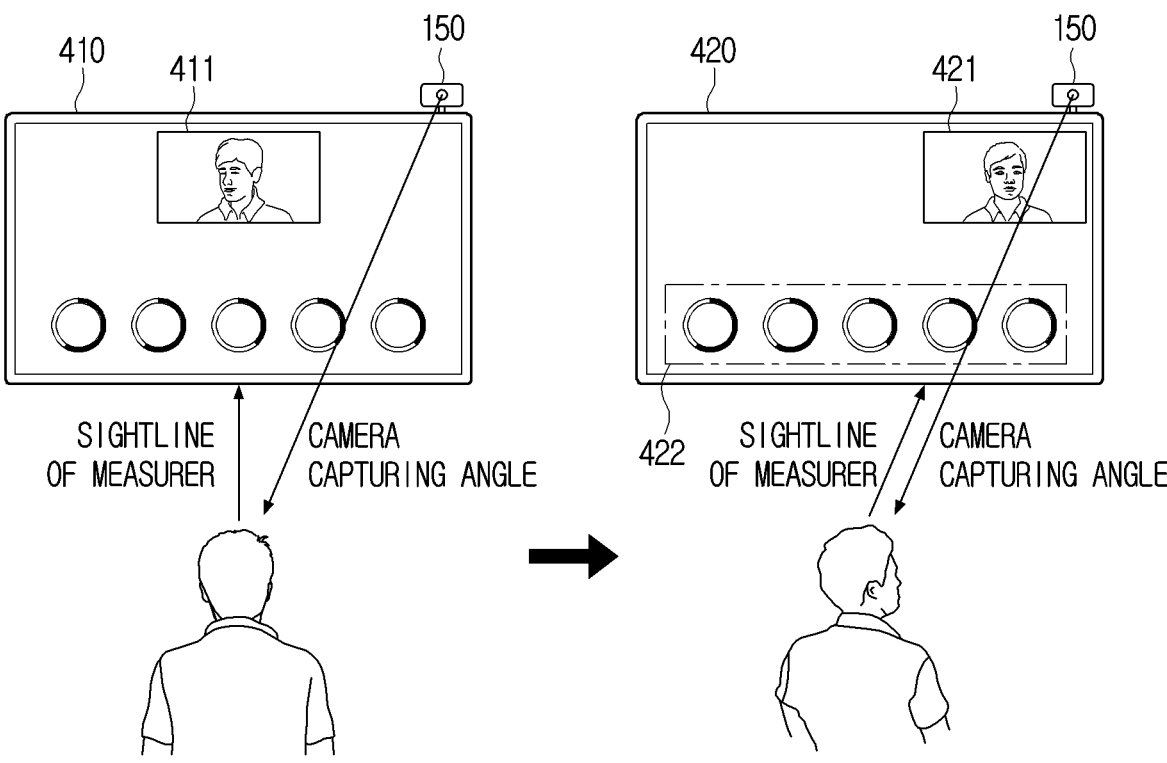
FIG. 4 is a diagram illustrating an example execution of a display operation of a guide image, according to one or more embodiments of the disclosure.

FIG. 4 is a diagram illustrating an example execution of a display operation of a guide image, according to one or more embodiments of the disclosure.

Referring to FIG. 4, guide images 411 and 421 may be displayed during the biometric index measurement. If there is no pre-stored camera position information, a user image in a previously-captured image (such as a preparation image) may be displayed in a pre-set area (e.g., an area corresponding to a typical position for a camera) as shown therein. At this time, a guide image 411 is displayed within a portion of the screen 410 of the display.

Descriptions herein have assumed that a size of a display screen 410 is large compared to the position of the camera 150 and that a guide image 411 is displayed within a portion of the area of the display screen 410. However, if the size of the display screen 410 is small, and the camera 150 is disposed at a center area of the display, a guide image 411 corresponding to a screen size of the display screen 410 may be displayed.

As described above, a user has a tendency to look at his or her face. Accordingly, if the guide image 411 is displayed at the center area of the display screen 410, the user may look at the corresponding guide image 411. If the camera 150 is disposed at a right side surface and not at the center of the display apparatus as shown in FIG. 4, the face of the user captured from the camera 150 may be a side image distorted by a certain angle and not facing the front surface direction.

If the measurement of the biometric index uses only a front area of the face, or if using the front area of the face has a high degree of measurement precision, the direction at which the user is looking at to the front direction of the camera may be guided.

Accordingly, the display apparatus 100 may display a screen in which a guide image 421 is displayed at a right upper-side side surface of the screen; for example, an area adjacent with the camera 150.

As described above, based on the guide image 421 being displayed in an area corresponding to the position of the camera 150, the face direction (or sightline direction) of the user may naturally face toward the camera 150.

In addition, the display apparatus 100 may display progress information 422 displaying a rate of progress of the measurement process together with the guide image 421 during measurement. For example, in an embodiment where five biometric indexes are measured, a measurement progress rate for each of the biometric indexes may be displayed as a circular diagram in the progress information 422, as shown in FIG. 4.

The progress information 422 shown in FIG. 4 is only an example, and other embodiments may display a whole progress rate rather than individual progress rates for each index. Additionally, in other embodiments, the biometric index being measured and corresponding items displayed may be less than or equal to four items, greater than or equal to six items, or the like. In addition, a display form may also be represented in numerical values and not as a circular diagram. Still other suitable user interface (UI) forms may be used.

For convenience of description, the front surface direction of the user's face is described herein as used for the measurement of the biometric index. However, if capturing another direction, such as an area distorted by a certain direction rather than the front surface direction of the face, is advantageous for the measurement of the biometric index, it may be realized in a form in which the position of the guide image is changed for the face of the user in the corresponding direction to be measured.

For example, even if the guide image 421 is displayed at an area near to the position of the camera 150, as in the depicted second screen 420, if a side surface area is more advantageous than the front surface of the face of the user in measuring the biometric index, the guide image 411 may be displayed instead, positioned slightly spaced apart from the position of the camera 150, as in the depicted first screen 410. In similar manner, the user may be directed to look toward any specific advantageous direction.

In summary, a preparation face image of the user that is captured may be identified. Then, based on the facial area that is advantageous to the measurement of the biometric index according to the face of the user, as well as whether or not glasses are worn, whether or not a hat is worn, a hairstyle, or the like, varying for each user, an area of the face that is advantageous to the measurement of the biometric index in the identified face image may be identified, and the position of the guide image may be identified such that the identified area of the face may face toward the front surface of the camera. As such, a guide area of a screen "corresponding to" a position of the camera need not be an area of the screen most proximate to the camera, but may instead be an area which, if looked at by a user, will provide the desired angle of the user's face for capture by the camera.

Figure 5:
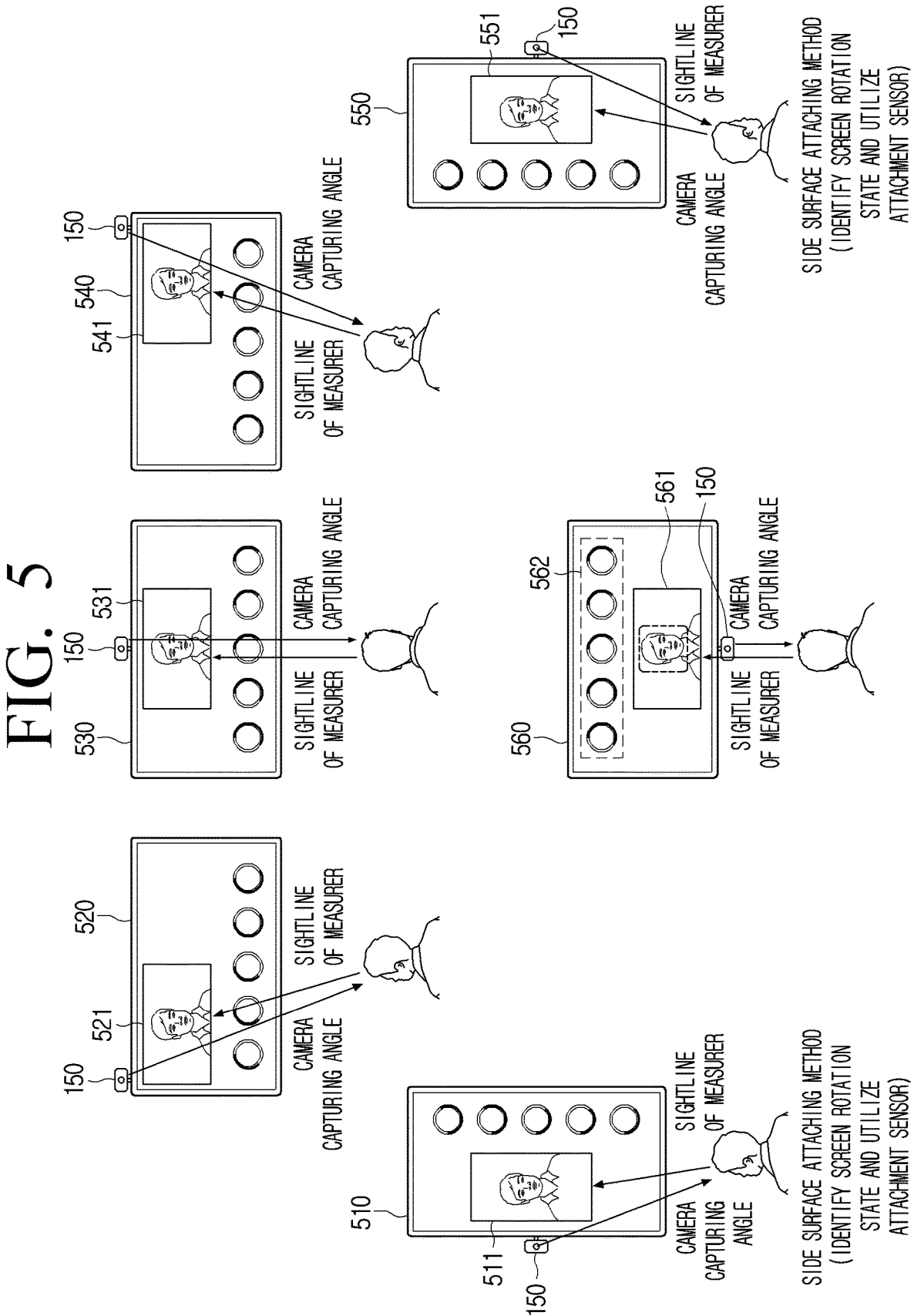
FIG. 5 is a diagram illustrating example positions of a guide image corresponding to each of various camera positions, according to one or more embodiments of the disclosure.

FIG. 5 is a diagram illustrating example positions of a guide image corresponding to each of various camera positions, according to one or more embodiments of the disclosure.

Referring to FIG. 5, various forms of apparatus and camera placement have been shown. For example, recent display apparatuses may be disposed in not only a horizontal mode form (e.g., screens 520, 530, 540, and 560) which is wider in a horizontal length, but also in a vertical mode form (e.g., screens 510 and 550) which is wider in a vertical length.

First, an example of various camera placements when disposed in the horizontal mode may be described.

The camera 150 may be not only disposed at an upper end of the display apparatus 100 (for, e.g., screens 520, 530, and 540), but also disposed at a lower end (for, e.g., screen 560). As described above, the camera 150 may be disposed at various positions, and a display position of the guide image may vary for each of the camera placement positions.

For example, if the camera 150 is disposed at an upper left side of the display, the display apparatus 100 may display a screen 520 in which the guide image 521 is displayed at the upper left side of the display so as to correspond to the camera position.

Further, if the camera 150 is disposed at an upper end center of the display, the display apparatus 100 may display a screen 530 in which the guide image 531 is displayed at the upper end center of the display so as to correspond to the camera position.

Further, if the camera 150 is disposed at an upper right side of the display, the display apparatus 100 may display a screen 540 in which the guide image 541 is displayed at the upper right side of the display so as to correspond to the camera position.

Further, if the camera 150 is disposed at a lower end center of the display, the display apparatus 100 may display a screen 560 in which the guide image 561 is displayed at the lower end center of the display so as to correspond to the camera position.

Additionally, as shown in FIG. 5, if information displaying the measurement process is displayed together with the guide image, the guide image and an image notifying of matters of progress may have a different layout form so as to correspond to the position of the camera. For example, in a screen 560 for which the guide image 561 is displayed at a lower side area, the progress information 562 may be displayed at an upper side area.

Further, if the display apparatus 100 is disposed in the vertical mode, screens 510, 550 respectively displaying the guide images 511, 551 at areas corresponding to the camera positions may be displayed, based on the camera 150 being disposed at a left or right side thereof.

FIG. 5 presents examples of the possible configurations and arrangements of the camera, screen, image, and information, but the disclosure is not limited thereto. Based on the various configurations and arrangements shown, one of ordinary skill will be able to extrapolate to other suitable configurations and arrangements wherein the guide image is displayed at a position corresponding to the position of the camera.

In order to make the user look at the camera direction as described above, the guide image may be displayed in a guide area corresponding to the camera position. To accomplish this, the position of the camera may first be identified. For example, based on the camera being embedded in the display apparatus 100 as described above, the position of the camera may be predicted by using position information pre-stored by the manufacturer, or through position information input from a separate sensor which is disposed, for example, at the bezel of the display apparatus 100, or through the face direction (or sightline direction) of the user through an image analysis of the image which captured the user. Alternatively, a screen of the display may be divided into a plurality of areas through the help of the user, an area most adjacent to the camera from among the plurality of areas may be selected by the user, and the guide image may be displayed in the selected area.

Figure 6:
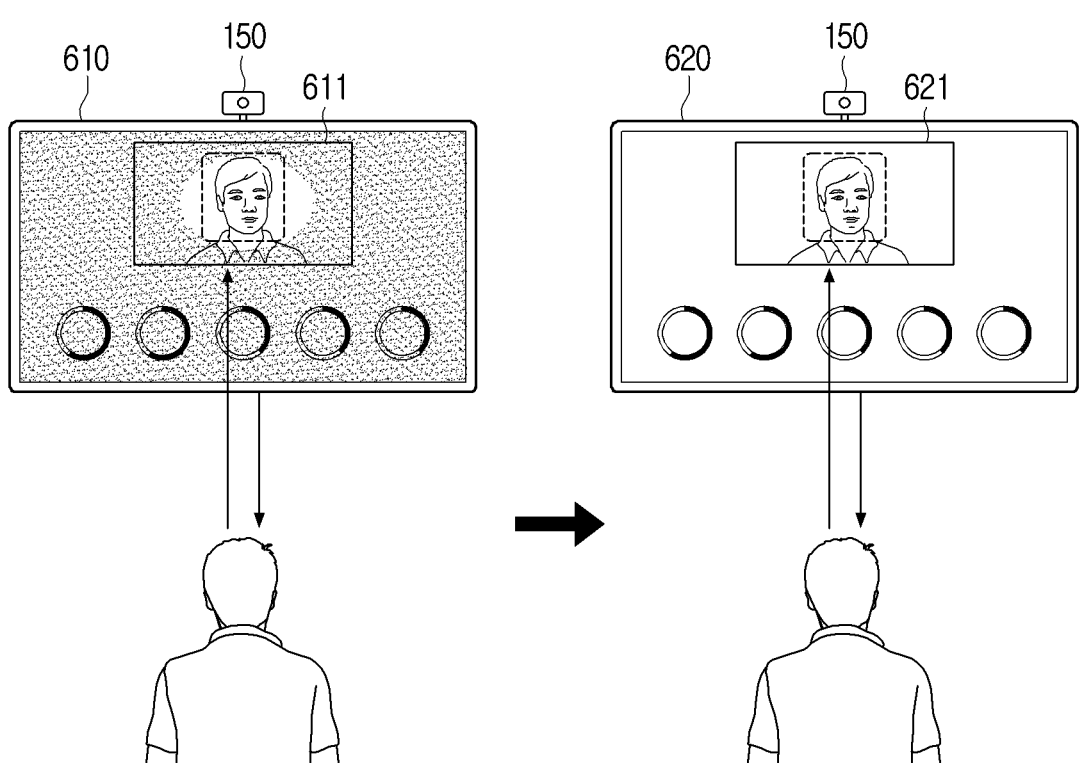
FIG. 6 is a diagram illustrating an example execution of an operation of adjusting a screen brightness based on a capturing environment, according to one or more embodiments of the disclosure.

FIG. 6 is a diagram illustrating an example execution of an operation of adjusting a screen brightness based on a capturing environment, according to one or more embodiments of the disclosure.

First, in order to accurately observe (or measure) the blood vessels and the like positioned on the face of the user, it is desirable to capture an image (more accurately, a face image) under sufficient luminance conditions.

If lighting is present at the back surface side of the user, and a shadow is cast on the face of the user captured from the camera, the degree of measurement precision may decrease. However, based on the display apparatus 100 being an apparatus that emits light, the display apparatus 100 may be further exploited as a front surface lighting.

For example, if lighting is sufficient as shown in FIG. 6, a screen 610 may be displayed at a pre-set screen brightness. Alternatively, lighting is not sufficient in the environment, the display apparatus 100 may display a screen 620 in which the screen brightness of the display is increased to a target brightness value.

The setting of the screen brightness as described above may be carried out for example, by increasing a brightness value of the screen (or images) to be displayed (a method of adjusting a brightness value of an image), or by adjusting a brightness value of the display or its backlight itself while the brightness value of the images that form the screen are maintained. Further, the two methods may be combined, employing both the method of improving the brightness of the screen that includes the guide image and the method of changing a brightness setting value of the display itself.

For example, if the brightness value of the screen is normally set at 60%, the method may include adjusting the brightness value to 100% when measuring the biometric index.

Alternatively, the brightness value in the guide area may be identically maintained before and after the measurement of the biometric index, and a background image or color in an area of the screen other than the guide area that displays the guide image (e.g. a background area) may be displayed using a brighter color or an otherwise increased brightness value.

The above-described target brightness value may be based on brightness value information detected from the face of the user alone, but may also be based on the detected size and brightness value of the user face together. In the latter case, a distance between the display apparatus and the user may be identified or estimated based on the detected size of the user face, and the target brightness value may be set accordingly, as the same brightness value may be less effective if the distance is greater and more effective if the distance is smaller.

The above-described target brightness value may be determined based on a pre-set lookup table. Alternatively, the brightness value of the display apparatus may be gradually adjusted (e.g., increased), and this adjustment of the brightness value may be stopped when a target light amount is identified from a captured presentation image.

Figure 7:
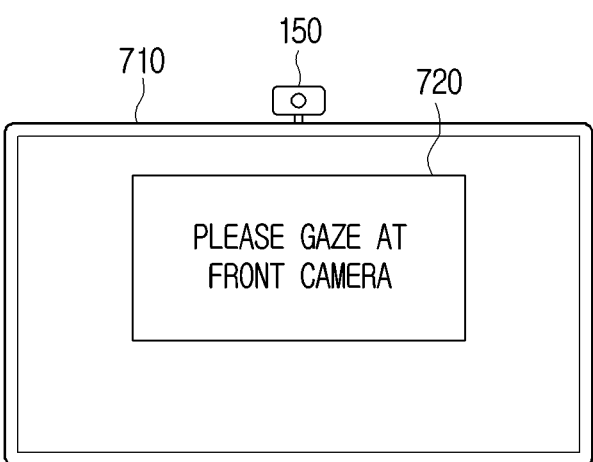
FIG. 7 is a diagram illustrating an example of a notification message which is displayable in a display apparatus according to one or more embodiments of the disclosure.

FIG. 7 is a diagram illustrating an example of a notification message which is displayable in a display apparatus, according to one or more embodiments of the disclosure.

Referring to FIG. 7, an example of a screen 710 displaying a notification message 720 requesting for the user to gaze at a front camera is shown. The notification message 720 may be displayed at an initial measurement starting timepoint of the biometric index The notification message 720 may be displayed during occurrence of an index measurement stop event such as the face direction of the user being undetected or distorted, as previously described.

In the example shown in FIG. 7, the above-described notification is shown as being displayed in a screen message, but the above-described notification may be performed with voice at realization, and may be output in a form in which the screen and voice are simultaneously output.

Figure 8:
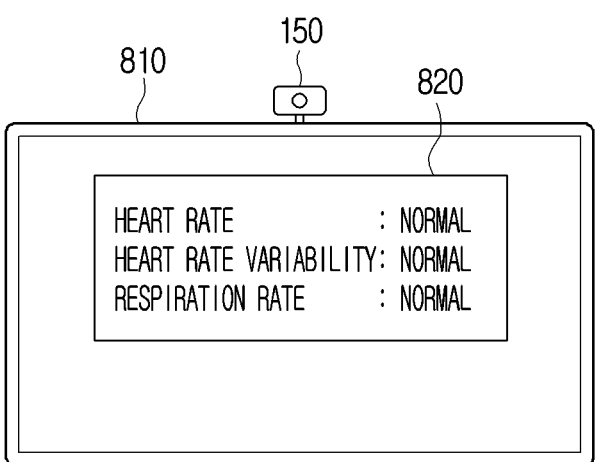
FIG. 8 is a diagram illustrating another example of a notification message which is displayable in a display apparatus, according to one or more embodiments of the disclosure.

FIG. 8 is a diagram illustrating another example of a notification message which is displayable in a display apparatus, according to one or more embodiments of the disclosure.

Referring to FIG. 8, an example of a screen 810 that is displayed on completion of the measurement of the biometric index is shown. In the example shown, a notification message 820 displays examination results each respectively corresponding to one of a plurality of measured biometric index. In another embodiment, a measurement value of each biometric index may be displayed. In the example shown, three biometric index results have been shown, but other biometric indexes in addition to or instead of the three may also be displayed in other embodiments.

Figure 9:
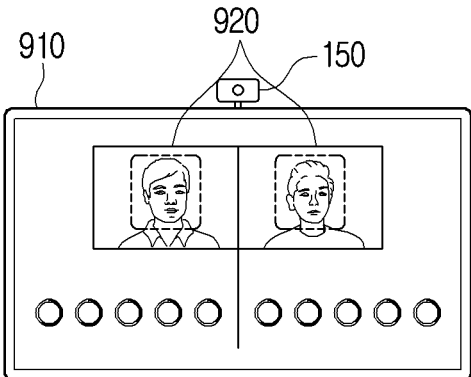
FIG. 9 is a diagram illustrating an example embodiment in which biometric indexes are simultaneously measured for a plurality of users, according to one or more embodiments of the disclosure.
Figure 9:
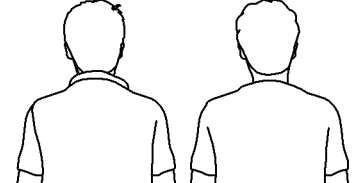

FIG. 9 is a diagram illustrating an example embodiment in which biometric indexes are simultaneously measured for a plurality of users, according to one or more embodiments of the disclosure.

Referring to FIG. 9, an example of simultaneously measuring the biometric indexes of the plurality of users is shown. Specifically, if the display apparatus is disposed at a living room, or the like, not just one but a plurality of users may be simultaneously positioned at a front surface of the display apparatus. In this case, the biometric index of all or any subset of the plurality of users may be measured, and the respective biometric indexes of each of the plurality of users may be measured simultaneously, as shown in FIG. 9.

For example, in a screen 910 shown in FIG. 9, a plurality of guide images 920 respectively corresponding to each user face may be displayed in an area corresponding to the position of the camera 150, for each user of the plurality of users to gaze at the camera 150.

Figure 10:
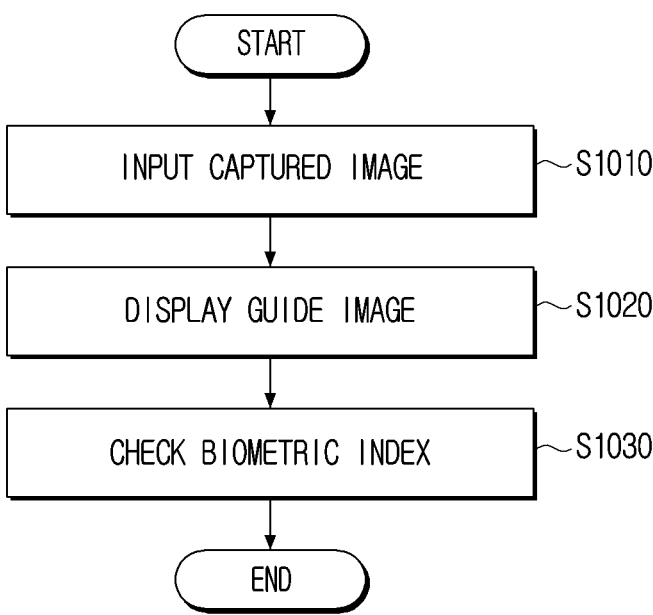
FIG. 10 is a flowchart illustrating an example method for display, according to one or more embodiments of the disclosure.

FIG. 10 is a flowchart illustrating an example method for display, according to one or more embodiments of the disclosure.

Referring to FIG. 10, an image of a face of a user positioned at a front surface of a display apparatus may be input as a preparation image (S1010). Specifically, the preparation image may be captured and input through a camera apparatus provided in the display apparatus, or captured and input through an external camera apparatus separate from the display apparatus.

Then, a guide image may be displayed in a guide area corresponding to a position of the camera which captured the preparation image, from among a plurality of areas of the display (S1020). To this end, the position of the camera may be identified in advance. Specifically, if the camera apparatus is provided in the display apparatus 100, the position of the camera may be identified using the camera position information which has been pre-stored by the manufacturer. Alternatively, if a sensor is present to identify the position of an external camera installed outside the display apparatus 100, the position of the camera may be identified based on a signal value input through the corresponding sensor. Alternatively, the face direction of the user in the input preparation image may be identified through an image analysis, and the position of the camera may be identified based on the face direction of the user.

Although the guide image has been shown as being displayed in an area corresponding to the position of the camera in the disclosure, the guide image may be displayed taking into consideration the camera position and the facial area (or face position) intended for use in the identifying of the biometric index at realization. In the disclosure, the guide image is displayed on the display for the user to look at the front of the camera assuming that the front area of the face is used to identify the biometric index. If the biometric index is to be measured by capturing of a side facial area of the user, the guide image may be displayed in an area in which the camera is able to capture the corresponding side facial area.

The above-described guide image may be a thumbnail image of an area corresponding to the face of the user from among the image provided from the camera. The thumbnail image may be combined with a specific guide line or a cross form specifying an area that the user is to look at on the screen.

Then, the biometric index of the user may be identified using a further input image provided from the camera—a measurement image—while displaying the guide image (S1030).

As described above, the brightness value of the facial area of the user may be identified in a preparation image captured while displaying the guide image, and a shadowing of the facial area may be identified based on the identified brightness value, for determining whether the front surface lighting is to be used. For example, if a specific lighting is disposed at a back side of the user in an environment that uses the display apparatus, and provides lighting in the captured image, the screen of the display apparatus may be used as further lighting to counteract the specific lighting. If the display apparatus is to be used as further lighting, the whole screen brightness of the display apparatus may be increased in order to more accurately measure the biometric index.

According to one or more embodiments of the disclosure, the various embodiments described above may be realized with software including instructions stored in a machine-readable storage media (e.g., computer). The machine may call an instruction stored in the storage medium, and as an apparatus operable according to the called instruction, may include an electronic apparatus (e.g., display apparatus 100) according to the above-mentioned embodiments. Based on the instruction being executed by the processor, the processor may directly or using other elements under the control of the processor perform a function corresponding to the instruction. The instruction may include a code generated by a compiler or executed by an interpreter. A machine-readable storage medium may be provided in the form of a non-transitory storage medium. Herein, "non-transitory" merely means that the storage medium is tangible and does not include a signal, and the term does not differentiate between data being semi-permanently stored and data being temporarily stored in the storage medium.

In addition, according to one or more embodiments, a method according to the various embodiments described above may be provided included a computer program product. The computer program product may be exchanged between a seller and a purchaser as a commodity. The computer program product may be distributed in the form of the machine-readable storage medium (e.g., a compact disc read only memory (CD-ROM)), or distributed online through an application store (e.g., PLAYSTORE™). In the case of online distribution, at least a portion of the computer program product may be stored at least temporarily in the storage medium such as a server of a manufacturer, a server of an application store, or a memory of a relay server, or temporarily generated.

In addition, according to one or more embodiments of the disclosure, the various embodiments described above may be implemented in a recordable medium which is readable by a computer or a device similar to the computer using software, hardware, or the combination of software and hardware. In some cases, embodiments described herein may be implemented by the processor itself. According to a software implementation, embodiments such as the procedures and functions described herein may be implemented with separate software modules. The respective software modules may perform one or more functions and operations described herein.

Computer instructions for performing processing operations in the machine according to the various embodiments described above may be stored in a non-transitory computer-readable medium. The computer instructions stored in this non-transitory computer-readable medium may cause a specific device to perform a processing operation of the machine according to the above-described various embodiments when executed by a processor of the specific device. Here, "non-transitory computer-readable medium" may refer to a medium that stores data semi-permanently rather than storing data for a very short time, such as a register, a cache, a memory, or the like, and is readable by a device. Specific examples of the non-transitory computer-readable medium may include, for example, and without limitation, a compact disc (CD), a digital versatile disc (DVD), a hard disc, a Blu-ray disc, a USB, a memory card, a ROM, and the like.

In addition, respective elements (e.g., a module or a program) according to various embodiments described above may be formed of a single entity or a plurality of entities, and some sub-elements of the above-mentioned sub-elements may be omitted or other sub-elements may be further included in the various embodiments. Alternatively or additionally, some elements (e.g., modules or programs) may be integrated into one entity to perform the same or similar functions performed by the respective corresponding elements prior to integration. Operations performed by a module, a program, or other element, in accordance with the various embodiments, may be executed sequentially, in parallel, repetitively, or in a heuristically manner, or at least some operations may be performed in a different order, omitted, or a different operation may be added.

While the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. A display apparatus for guided biometric index measurement, the display apparatus comprising:
   a display; and
   at least one processor configured to:
      identify a guide area, among a plurality of areas of the display, corresponding to a position of a camera,
      control the display to display a guide image in the guide area, input at least one preparation image of a face of a user captured by the camera, prior to capturing a measurement image used to measure a biometric index of the user,
      identify a facial area of the user in the at least one preparation image,
      identify brightness information of the identified facial area,
      identify a target brightness value based on the brightness information of the facial area of the user, in response to the identified brightness information being less than or equal to a pre-set value,
      control the display, based on the target brightness value, and
      identify the biometric index of the user positioned at a front surface of the display, based on the measurement image of the face of the user captured by the camera during display of the guide image in the guide area.

2. The display apparatus of claim 1, wherein the at least one processor is further configured to identify the guide area to be an area corresponding to a line segment adjacent to the camera from among a plurality of line segments of the display, and further corresponding to a position adjacent to the camera on the line segment adjacent to the camera.

3. The display apparatus of claim 1, further comprising:
   the camera; and
   a memory configured to store position information of the camera,
   wherein the at least one processor is further configured to identify the guide area to be an area corresponding to the position information of the camera.

4. The display apparatus of claim 1, further comprising a sensor configured to detect the position of the camera, the camera being positioned at a surrounding of the display apparatus,
   wherein the at least one processor is configured to identify the guide area to be an area of the plurality of areas corresponding to the detected position of the camera.

5. The display apparatus of claim 1, wherein the at least one processor is further configured to:
   identify a face direction of the user in the at least one preparation image of the face of the user, captured by the camera prior to capture of the measurement image, and
   identify the guide area to be an area corresponding to the identified face direction.

6. The display apparatus of claim 5, further comprising a memory,
   wherein the at least one processor is further configured to:
      estimate a camera position based on the identified face direction of the user in the at least one preparation image, and
      store information indicating the estimated camera position in the memory.

7. The display apparatus of claim 5, wherein the at least one processor is further configured to display the guide image at a pre-set area of the plurality of areas prior to identifying the biometric index, and
   wherein the at least one preparation image is captured by the camera while the guide image is displayed at the pre-set area.

8. The display apparatus of claim 1, wherein the guide image is a face image of the user in the at least one preparation image captured by the camera prior to capture of the measurement image.

9. The display apparatus of claim 1, wherein the at least one processor is further configured to control the display to set a screen brightness of at least one area of the plurality of areas of the display to the target brightness value during display of the guide image while identifying the biometric index.

10. The display apparatus of claim 9, wherein the at least one processor is further configured to:

identify a size of the identified facial area of the user in the at least one preparation image, and identify the target brightness value based on the identified size of the facial area and the identified brightness information.

11. The display apparatus of claim 9, wherein the at least one processor is further configured, during display of the guide image, to control the display to set a screen brightness of each area of the plurality of areas of the display to the target brightness value.

12. The display apparatus of claim 9, wherein the at least one processor is further configured, during display of the guide image, to control the display to maintain a screen brightness of the guide area and set a screen brightness of a background area other than the guide area to the target brightness value.

13. The display apparatus of claim 9, wherein the at least one processor is further configured, during display of the guide image, to control the display to:

gradually increase the screen brightness of the at least one area, and stop adjustment of the screen brightness of the at least one area responsive to identification of a target light amount in a preparation image captured by the camera.

14. The display apparatus of claim 1, wherein the at least one processor is further configured to control the display to further display information indicating an identified progress rate of the biometric index while identifying the biometric index.

15. The display apparatus of claim 1, wherein the at least one processor is further configured to:

control the display to display a plurality of guide images in the guide area corresponding to each of a plurality of users positioned at the front surface of the display, and identify respective biometric indexes of each of the plurality of users, respectively.

16. A method for guided biometric index measurement, the method comprising:

identifying a guide area, of a plurality of areas of a display of a display apparatus, corresponding to a position of a camera;

displaying a guide image in the guide area on the display;

receiving input of at least one preparation image of a face of a user captured by the camera, prior to capturing a measurement image used to measure a biometric index of the user;

identifying a facial area of the user in the at least one preparation image;

identifying brightness information of the identified facial area;

identifying a target brightness value based on the brightness information of the facial area of the user, in response to the identified brightness information being less than or equal to a pre-set value;

controlling the display, based on the target brightness value;

receiving input of the measurement image, captured by the camera during display of the guide image in the guide area, of the face of the user positioned at a front surface of the display apparatus; and identifying the biometric index of the user based on the measurement image.

17. The method of claim 16, further comprising:

displaying the guide image at a pre-set area of the plurality of areas prior to identifying the biometric index;

identifying a face direction of the user in the at least one preparation image of the face of the user, captured by the camera while the guide image is displayed at the pre-set area; and identifying the guide area to be an area corresponding to the identified face direction.

18. The method of claim 16, further comprising:

identifying a size of the identified facial area;

identifying the target brightness value based on the identified size of the facial area and the identified brightness information, responsive to the identified brightness information being less than or equal to the pre-set value; and setting a screen brightness of at least one area of the plurality of areas of the display to the target brightness value during display of the guide image while identifying the biometric index.

19. A non-transitory computer-readable recording medium having stored thereon instructions executable by at least one processor to perform operations comprising:

identifying a guide area, of a plurality of areas of a display of a display apparatus, corresponding to a position of a camera;

displaying a guide image in the guide area on the display;

receiving input of at least one preparation image of a face of a user captured by the camera, prior to capturing a measurement image used to measure a biometric index of the user;

identifying a facial area of the user in the at least one preparation image;

identifying brightness information of the identified facial area;

identifying a target brightness value based on the brightness information of the facial area of the user, in response to the identified brightness information being less than or equal to a pre-set value;

controlling the display, based on the target brightness value;

receiving input of the measurement image, captured by the camera during display of the guide image in the guide area, of the face of the user positioned at a front surface of the display apparatus; and identifying the biometric index of the user based on the measurement image.

* * * * *